United States Patent [19]
Mittal

[11] Patent Number: 5,829,025
[45] Date of Patent: Oct. 27, 1998

[54] COMPUTER SYSTEM AND METHOD OF ALLOCATING CACHE MEMORIES IN A MULTILEVEL CACHE HIERARCHY UTILIZING A LOCALITY HINT WITHIN AN INSTRUCTION

[75] Inventor: Millind Mittal, South San Francisco, Calif.

[73] Assignee: Intel Corporation, Santa Clara, Calif.

[21] Appl. No.: 767,950

[22] Filed: Dec. 17, 1996

[51] Int. Cl.$^6$ ............................. G06F 13/00; G06F 12/12
[52] U.S. Cl. ........................ 711/122; 711/133; 711/137; 711/139; 395/383
[58] Field of Search ................................ 711/122, 137, 711/133, 138, 139, 159, 144; 395/383

[56] References Cited

U.S. PATENT DOCUMENTS

| | | | |
|---|---|---|---|
| 4,928,239 | 5/1990 | Baum et al. | 711/136 |
| 5,537,573 | 7/1996 | Ware et al. | 711/137 |
| 5,652,858 | 7/1997 | Okada et al. | 711/137 |
| 5,689,679 | 11/1997 | Jouppi | 711/122 |

OTHER PUBLICATIONS

"Pentium Family User's Manual, Vol.2: 82496/82497 Cache Controller and 82491/82492 Cache SRAM Data Book;" Intel Corporation; 1994; pp. 2–1 to 2–10,3–1 to 3–23 & 4–1 to 4–13.

"i750, i860, i960 Processors and Related Products;" Intel Corporation; 1994; pp. 2–39 to 2–47.

*Primary Examiner*—Glenn Gossage
*Attorney, Agent, or Firm*—Blakely, Sokoloff, Taylor & Zafman

[57] ABSTRACT

A computer system and method in which allocation of a cache memory is managed by utilizing a locality hint value included within an instruction. When a processor accesses a memory for transfer of data between the processor and the memory, that access can be allocated or not allocated in the cache memory. The locality hint included within the instruction controls if the cache allocation is to be made. When a plurality of cache memories are present, they are arranged into a cache hierarchy and a locality value is assigned to each level of the cache hierarchy where allocation control is desired. The locality hint may be used to identify a lowest level where management of cache avocation is desired and cache memory is allocated at that level and any higher level(s). The locality hint value is based on spatial and/or temporal locality for the data associated with the access. Data is recognized at each cache hierarchy level depending on the attributes associated with the data at a particular level. If the locality hint identifies a particular access for data as temporal or non-temporal with respect to a particular cache level, the particular access may be determined to be temporal or non-temporal with respect to the higher and lower cache levels.

9 Claims, 7 Drawing Sheets

COMPUTER SYSTEM AND METHOD OF ALLOCATING CACHE MEMORIES IN A MULTILEVEL CACHE HIERARCHY UTILIZING A LOCALITY HINT WITHIN AN INSTRUCTION

BACKGROUND OF THE INVENTION

1. Field of the Invention

The present invention relates to the field of processors and, more particularly, to a technique of providing hierarchical management of cache memories.

2. Background of the Related Art

The use of a cache memory with a processor is well known in the computer art. A primary purpose of utilizing cache memory is to bring the data closer to the processor in order for the processor to operate on that data. It is generally understood that memory devices closer to the processor operate faster than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

A computer system may utilize one or more levels of cache memory. Allocation and de-allocation schemes implemented for the cache for various known computer systems are generally similar in practice. That is, data that is required by the processor is cached in the cache memory (or memories). If a miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

General practice has been to allocate cache for all accesses required by the processor. Accordingly, system architectures specify re-use of accessed data without notion of relevant cache hierarchy level. That is, all accesses are allocated in cache. A disadvantage of this approach is that it does not address instances where data is only read once with respect to a cache level, but where that same data maybe re-used with respect to another cache level. One solution (implemented as a cache bypass operation) provides for a load instruction to bypass the cache altogether by not allocating the cache for certain accesses. However, this technique does not provide flexibility in programming and when implemented, applies for all applications.

It is appreciated that in some operations, system performance can be enhanced by not allocating the cache. It would also be advantageous if cache allocation can be programmed by software. Furthermore, advantages can be gained if cache memory allocation can be based on the application which is to be executed and if such allocation can be managed based on the particular level of the cache memory within the cache hierarchy.

The present invention describes a technique of providing for a hierarchical cache memory management structure in which cache allocation criteria are established at a particular cache hierarchy level.

SUMMARY OF THE INVENTION

The present invention describes a technique for providing allocation of a cache memory by utilizing a locality hint associated with an instruction. When a processor accesses a memory for transfer of data between the processor and the memory, that access can be allocated or not allocated in a cache memory. The locality hint associated with the instruction provides the programming controls if cache allocation is to be made.

When a plurality of cache memories are present, they are arranged as a cache hierarchy, usually with the lowest level being closest to the processor. A locality hint value is assigned for one or more of the cache level(s) in order to categorize the data at each cache hierarchy level. The locality hint values identify which cache levels are to be allocated for the particular data transfer. Thus, the management of cache memory at each level is based on the locality hint value, which is provided by a bit or bits in the particular instruction.

In the practice of the present invention, cache allocation management is based on temporal (or non-temporal) and spatial (or non-spatial) nature of the data access. However, in the preferred embodiment, only temporal:spatial and non-temporal:spatial categories are used with the locality hints. Thus, each cache level can have either of two states for the data. Accordingly, the locality hints associated with the particular instruction determines if the data is to be categorized as temporal:spatial data (cached) or non-temporal:spatial data (not cached).

DETAILED DESCRIPTION OF THE PREFERRED EMBODIMENTS

A technique is described for providing hierarchical management of cache memories, in which cache allocation is determined by data utilization. In the following description, numerous specific details are set forth, such as specific memory devices, circuit diagrams, processor instructions, etc., in order to provide a thorough understanding of the present invention. However, it will be appreciated by one skilled in the art that the present invention may be practiced without these specific details. In other instances, well known techniques and structures have not been described in detail to avoid obscuring the present invention. It is to be noted that a particular implementation is described as a preferred embodiment of the present invention, however, it should be readily understood that other embodiments can be designed and implemented without departing from the spirit and scope of the present invention. Furthermore, it is appreciated that the present invention is described in reference to a serially arranged cache hierarchy system, but it need not be limited strictly to such a hierarchy.

Figure 1:
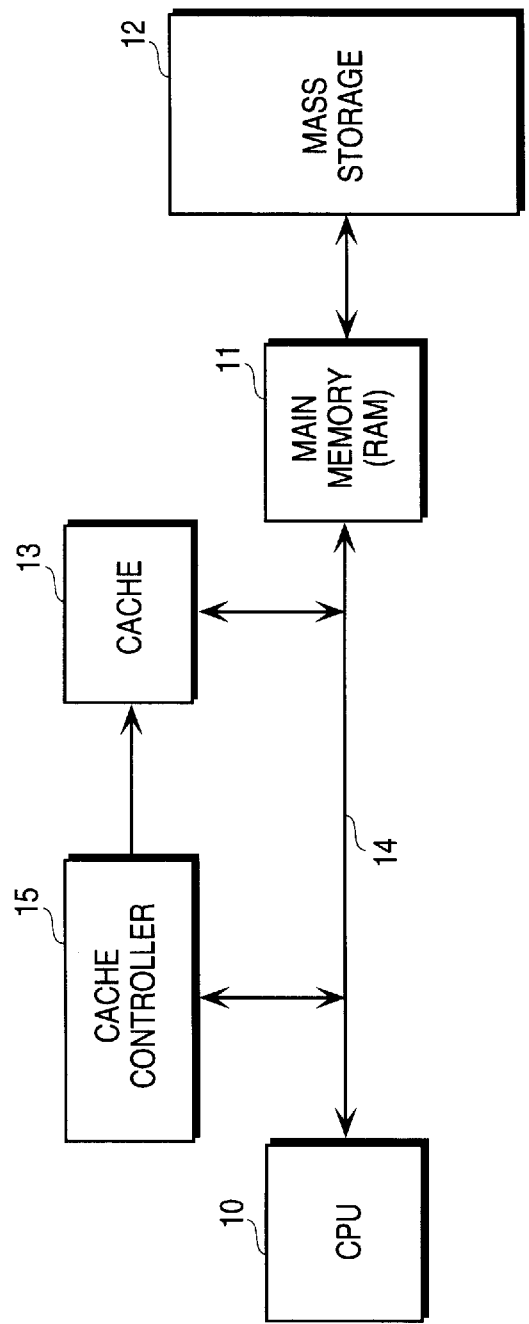
FIG. 1 shows a circuit block diagram of a prior art computer system, in which a cache memory is used for data accesses between a main memory and processor of the computer system.

Referring to FIG. 1, a typical prior art computer system is shown, wherein a processor 10, which forms the central processing unit (CPU) of the computer system is coupled to a main memory 11 by a bus 14. The main memory 11 is typically comprised of a random-access-memory (RAM). The main memory 11 is generally coupled to a mass storage device 12, such as a magnetic or optical memory device, for mass storage (or saving) of information. A cache memory 13 (hereinafter also referred to simply as "cache") is coupled to the bus 14 as well. The cache 13 is shown located between the CPU 10 and the main memory 11, in order to exemplify the functional utilization and transfer of data associated with the cache 13. It should be appreciated that the actual physical placement of the cache 13 can vary depending on the system and the processor architecture. Furthermore, a cache controller 15 is shown coupled to the cache 13 and the bus 14 for controlling the operation of the cache 13. The operation of a cache controller, such as the controller 15, is known in the art and, accordingly, in the subsequent Figures, cache controllers are not illustrated. It is presumed that some controller(s) is/are present under control of the CPU 10 to control the operation of cache(s) shown.

In operation, information transfer between the memory 11 and the CPU 10 is achieved by memory accesses from the CPU 10. When data is currently or shortly to be accessed by the CPU 10, that data is first allocated in the cache 13. That is, when the CPU 10 accesses a given information from the memory 11, it seeks the information from the cache 13. If the accessed data is in the cache 13, a "hit" occurs. Otherwise, a "miss" results and cache allocation for the data is sought. As currently practiced, all accesses (whether load or store) require the allocation of the cache 13 (except for the limited exception noted in the Background section above when the cache is bypassed).

Figure 2:
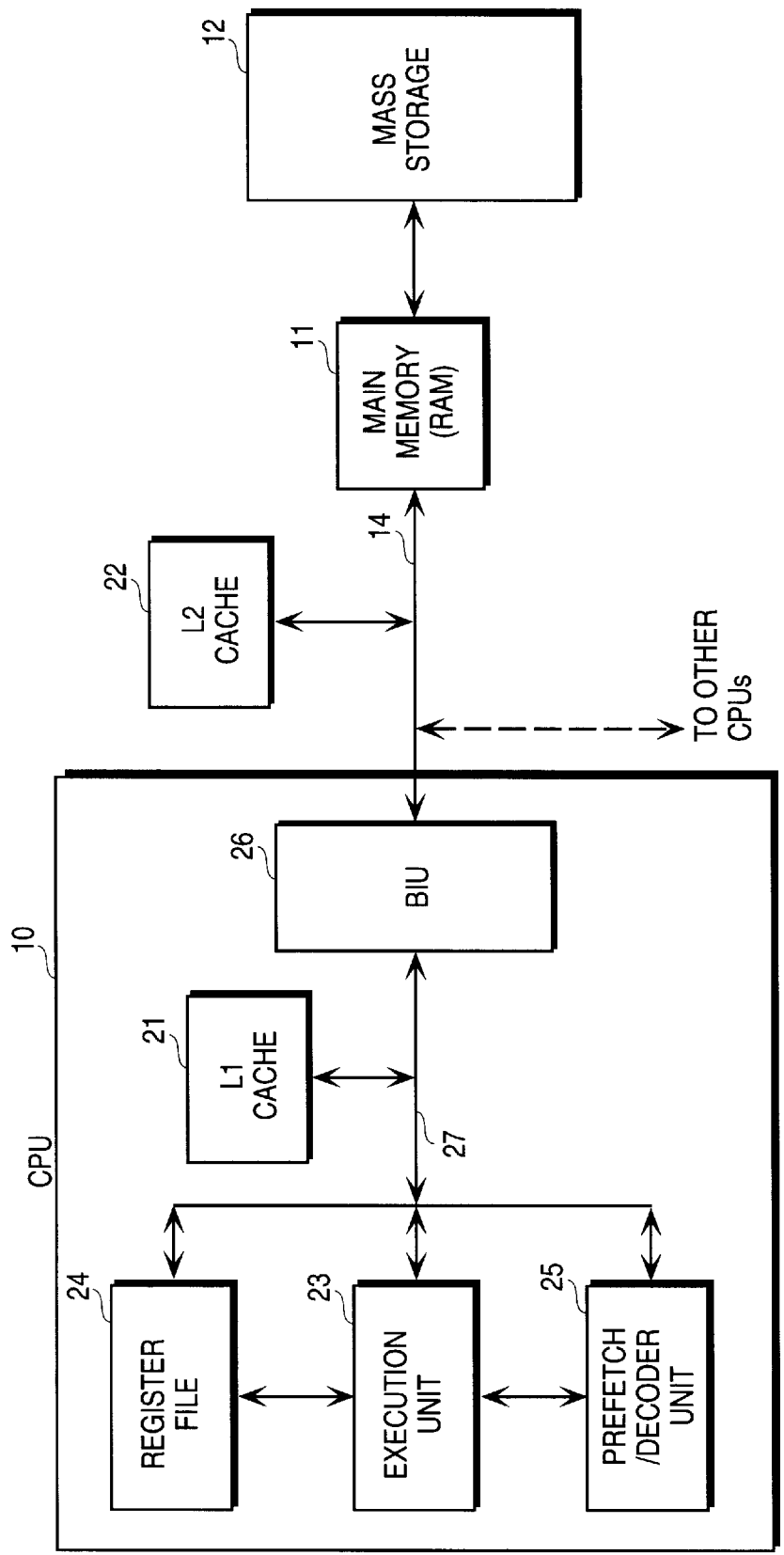
FIG. 2 shows a circuit block diagram of an exemplary prior art computer system, in which two cache memories are arranged into cache memory levels for accessing of data between a main memory and a processor(s) of the computer system.

Referring to FIG. 2, a prior art computer system implementing a multiple cache arrangement is shown. The CPU 10 is shown coupled to the main memory 11 by the bus 14 and the memory 11 is coupled to the mass storage device 12. In the example of FIG. 2, two separate cache memories 21 and 22 are shown. The caches 21–22 are shown arranged serially and each is representative of a cache level, referred to as Level 1 (L1) cache and Level 2 (L2) cache, respectively. Furthermore, the L1 cache 21 is shown as an internal part of the CPU 10, while the L2 cache 22 is shown external to the CPU 10. This structure exemplifies the current practice of placing the L1 cache on the processor chip while higher level caches are placed external to it. The actual placement of the various cache memories is a design choice or dictated by the processor architecture. Thus, it is appreciated that the L1 cache could be placed external to the CPU 10.

Generally, CPU 10 includes an execution unit 23, register file 24 and prefetch/decoder unit 25. The execution unit 23 is the processing core of the CPU 10 for executing the various processor instructions. The register file 24 is a set of general purpose registers for storing (or saving) various information required by the execution unit 23. There may be more than one register file in more advanced systems. The prefetch/decoder unit 25 fetches instructions from a storage location (such as the main memory 11) holding the instructions of a program that will be executed and decodes these instructions for execution by the execution unit 23. In more advanced processors utilizing pipelined architecture, future instructions are prefetched and decoded before the instructions are actually needed so that the processor is not idle waiting for the instructions to be fetched when needed.

The various units 23–25 of the CPU 10 are coupled to an internal bus structure 27. A bus interface unit (BIU) 26 provides an interface for coupling the various units of CPU 10 to the bus 14. As shown in FIG. 2, the L1 cache is coupled to the internal bus 27 and functions as an internal cache for the CPU 10. However, again it is to be emphasized that the L1 cache could reside outside of the CPU 10 and still be coupled to the bus 14. The caches can be used to cache data, instructions or both. In some systems, the L1 cache is actually split into two sections, one section for caching data and one section for caching instructions. However, for simplicity of explanation, the various caches described in the Figures are shown as single caches with data, instructions and other information all referenced herein as data. It should be appreciated that the operations of the units shown in FIG. 2 are known. Furthermore it should be appreciated that the CPU 10 actually includes many more components than just the components shown. Thus, only those structures pertinent to the understanding of the present invention are shown in FIG. 2.

It is also to be noted that the computer system may be comprised of more than one CPU (as shown by the dotted line in FIG. 2). In such a system, it is typical for multiple CPUs to share the main memory 11 and/or mass storage unit 12. Accordingly, some or all of the caches associated with the computer system may be shared by the various processors of the computer system. For example, with the system of FIG. 2, L1 cache 21 of each processor would be utilized by its processor only, but the external L2 cache 22 would be shared by some or all of the CPUs of the system. The present invention can be practiced in a single CPU computer system or in a multiple CPU computer system. It is further noted that other types of units (other than processors) which access memory can function equivalently to the CPUs described herein and, therefore, are capable of performing the memory accessing functions similar to the described CPUs. For example, direct memory accessing (DMA) devices can readily access memory similar to the processors described herein. Thus, a computer system having one processor (CPU), but one or more of the memory accessing units would function equivalent to the multiple processor system shown described herein.

As noted, only two caches 21–22 are shown. However, the computer system need not be limited to only two levels of cache. It is now a practice to utilize a third level (L3) cache in more advanced systems. It is also the practice to have a serial arrangement of cache memories so that data cached in the L1 cache is also cached in the L2 cache. If there happens to be an L3 cache, then data cached in the L2 cache is typically cached in the L3 cache as well. Thus, data cached at a particular cache level is also cached at all higher levels of the cache hierarchy.

The currently practiced method in which the cache is allocated is based primarily on the spatial closeness of data in reference to the currently executed instruction in the CPU.

That is, for a given memory location accessed by the CPU 10, data at that location, as well as data within specified adjacent locations (stride) are cached. This is due to the current practice of using cache systems that obtain cache lines. Currently there is not a way to distinguish which accesses should be cached (or not cached) based on the use or re-use of data at a particular cache hierarchy level. The present invention provides for a way to manage the cache hierarchy to decide what information should be cached, and if cached, at which levels (if there are more than one). By permitting program instructions to control the caching decision, the cache allocation can be programmed based on the particular pattern of data usage. Thus, data pattern accesses requiring multiple re-use can be cached, while data pattern accesses requiring single use need not be allocated in the cache and such control can be made with respect to each level of the cache hierarchy.

Figure 3:
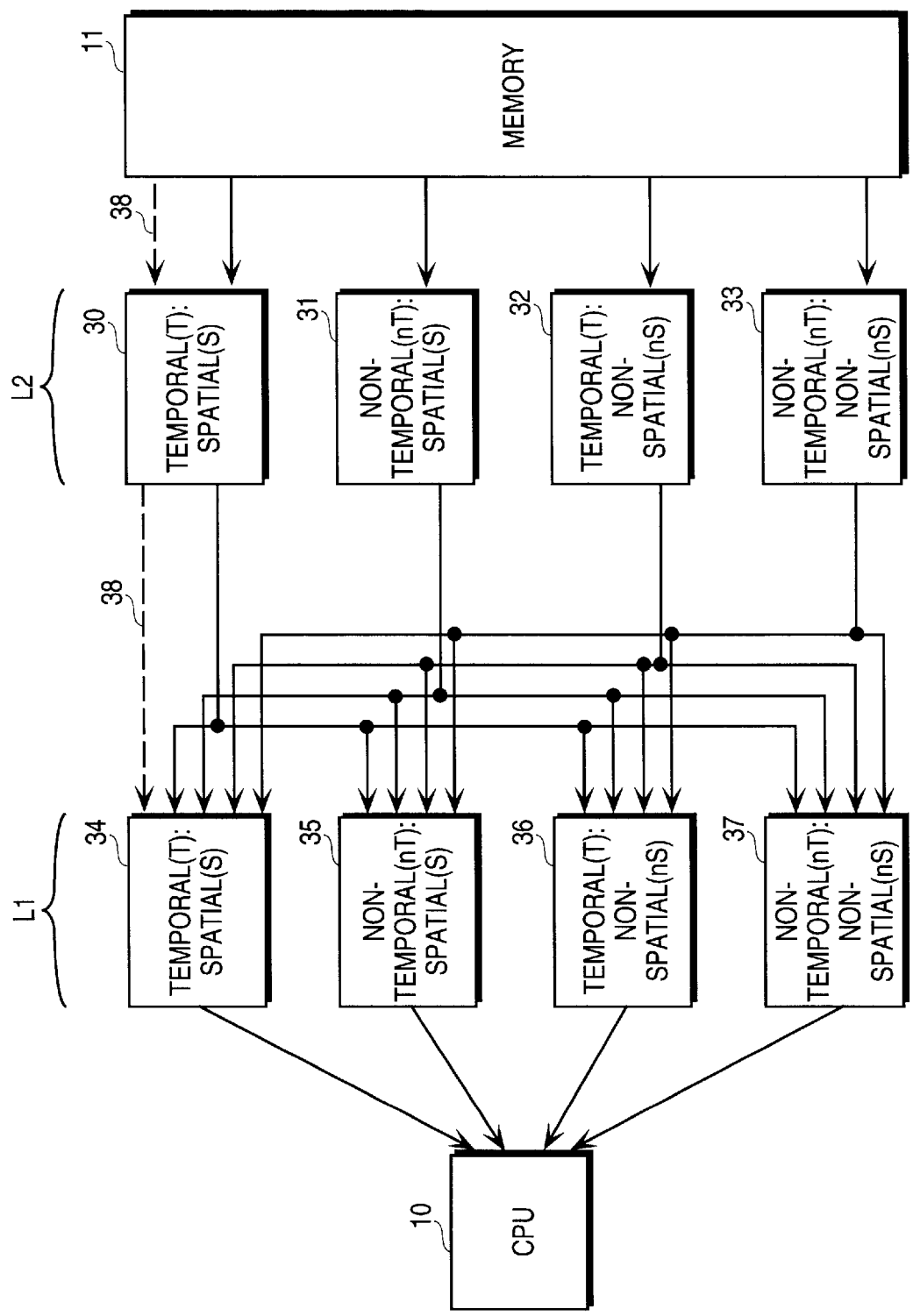
FIG. 3 shows a circuit block diagram of a computer system having two hierarchical levels of cache memories and utilizing the present invention to specify four data access attributes based on temporal and spatial parameters for the cache memories.

Referring to FIG. 3, a hierarchical cache management structure of the present invention is shown. However, in order to understand the present invention, certain terminology must be understood in reference to cache management. The present invention operates within the framework wherein the particular data being accessed will have (or not have) temporal locality and spatial locality. Temporal locality is an attribute associated with data and determined by how soon in the future a program will access the data. Spatial locality is an attribute associated with the storage of data and determined by how close the address locations of data being used are to each other. Thus, for each data pattern, the data may have temporal locality (T) or not have temporal locality (nT) with respect to a cache level in the hierarchy. Accordingly, that same data pattern may have spatial locality (S) or not have spatial locality (nS) with respect to a cache level in the hierarchy.

In FIG. 3, two levels of cache hierarchy are shown (representing levels L1 and L2), wherein at each level there are four possibilities for classifying the data pattern being accessed. The classifications are noted as 1) temporal and spatial (T:S); 2) non-temporal, but spatial (nT:S); 3) temporal, but non-spatial (T:nS); and 4) non-temporal and non-spatial (nT:nS). These four classification categories are represented by the four appropriately labeled blocks 34–37 at L1 and four similarly labeled blocks 30–33 at L2. The classifications are based on the attributes associated with the data access for a computer system. It should be appreciated that two levels of cache hierarchy are shown in FIG. 3, but there could be additional cache levels. Furthermore, the present invention could be practiced where there is only one cache level (L1 only). For each level of the cache hierarchy, there would be four blocks representing the four classification categories.

In the practice of the present invention, the temporal property is associated with how close to the CPU 10 the data is stored or saved. Accordingly, temporal is associated with the use or re-use of data at a given level. For example, if a particular data pattern in the program is identified to be T with respect to L1, but nT with respect to L2, then this data will be used in the near future in the L1 cache, but not in the near future in the L2 cache. The temporal distance of how soon the data will be used or re-used is application dependent for a particular computer system and software. When data access is regarded as T at a given cache level, it will be re-used within a certain time frame (for example, within x number of instructions) in the near future. Where data access is regarded as nT at a given level, it will not be re-used within the specified time frame.

The spatial property is associated with the stride (memory address range or distance) of a data pattern being accessed and can be designated S or nS at each of the levels in the cache hierarchy. That is, a program will utilize various data for a particular operation and the required data for this operation will reside at various memory locations. The address locations for the data can be close together or far apart. The stride range or distance for determining how close the data locations must be for the data to be regarded as within the spatial category is a design parameter of the computer system. The spatial requirement will depend on factors, such as cache size, minimum cache-line size and set associativity for the cache. For example, where the L2 cache is larger than the L1 cache, the stride range for the L2 cache can be made larger than that associated with the L1 cache.

Accordingly, as shown in FIG. 3, a data pattern access by the CPU 10 from memory 11 will have temporal and spatial attributes at each level of the cache hierarchy. Thus, data can be categorized as T:S (block 30), nT:S (block 31), T:nS (block 32) or nT:nS (block 33) at L2. Since there are also four data classification categories at L1, each data block 30–33 can take one of four similar attributes (as shown by corresponding blocks 34-37 at L1). The four paths from each block 30–33 of L2 to L1 are noted in FIG. 3. Again, if there are additional cache levels in the hierarchy, the interconnection between the cache levels would have similar paths as shown between L2 and L1 in FIG. 3. Finally, each of the blocks 34–37 of L1 are coupled to the CPU 10.

It should be appreciated that the currently implemented cache management systems are equivalent to providing the path 38 (shown by a dotted line 38), in that when a data access is made by the CPU 10, that data and its adjacent data having spatial locality are allocated at all levels of the cache hierarchy. Thus, the current practice is to treat accesses as having a T:S attribute at each level. The T:S data is cached at all levels of the hierarchy. The one exception being the condition noted earlier when the cache is bypassed altogether. The present invention, on the other hand, can provide multiple classifications of data access at each level of the cache hierarchy and caching or non-caching can be controlled at each level by the attributes associated with the data at a given level.

Since the T:S condition reflects general access patterns for scalar data and since most data accesses will fall in this category, the practice of treating all accesses as T:S may be adequate in many instances. However, in other situations performance can be lost when adhering to this rule. There are instances when data patterns do not fall within this general access (T:S) category. For example, the multiplying of two matrices ([A]×[B]) requires repeated use of column [B] data with the values of [A]. The prior art technique would not differentiate these operations from others when allocating the cache(s). However, by employing the present invention, the matrix [A] values could be designated as T:S at L2, but nT:S at L1. The column [B] data can still be regarded as T:S at both L1 and L2. Thus, the block of data for [A] can be cached in the large L2 cache, but not in the L1 cache. In another example, where data is used only once, such as for read-once data or for block copying from one address to another, such data accesses can be regarded as nT and need not be cached at all at any level of the cache hierarchy.

Thus, it should be appreciated that the present invention provides for a scheme in which data can be categorized at each cache hierarchy level depending on the attributes associated with the data at a particular level. Thus, the noted temporal and spatial criteria can be set based on the action required of the data. Once categorized, mechanisms (rules) can be put into place for how each of the categories are to be processed at each level. Thus, cache allocation can be based on none, one, or more than one, of the categories available at each of the levels. Further, the allocation rules can be changed at each of the levels, so that at one level a particular category is cached, but at another level the same category may not be cached.

Figure 4:
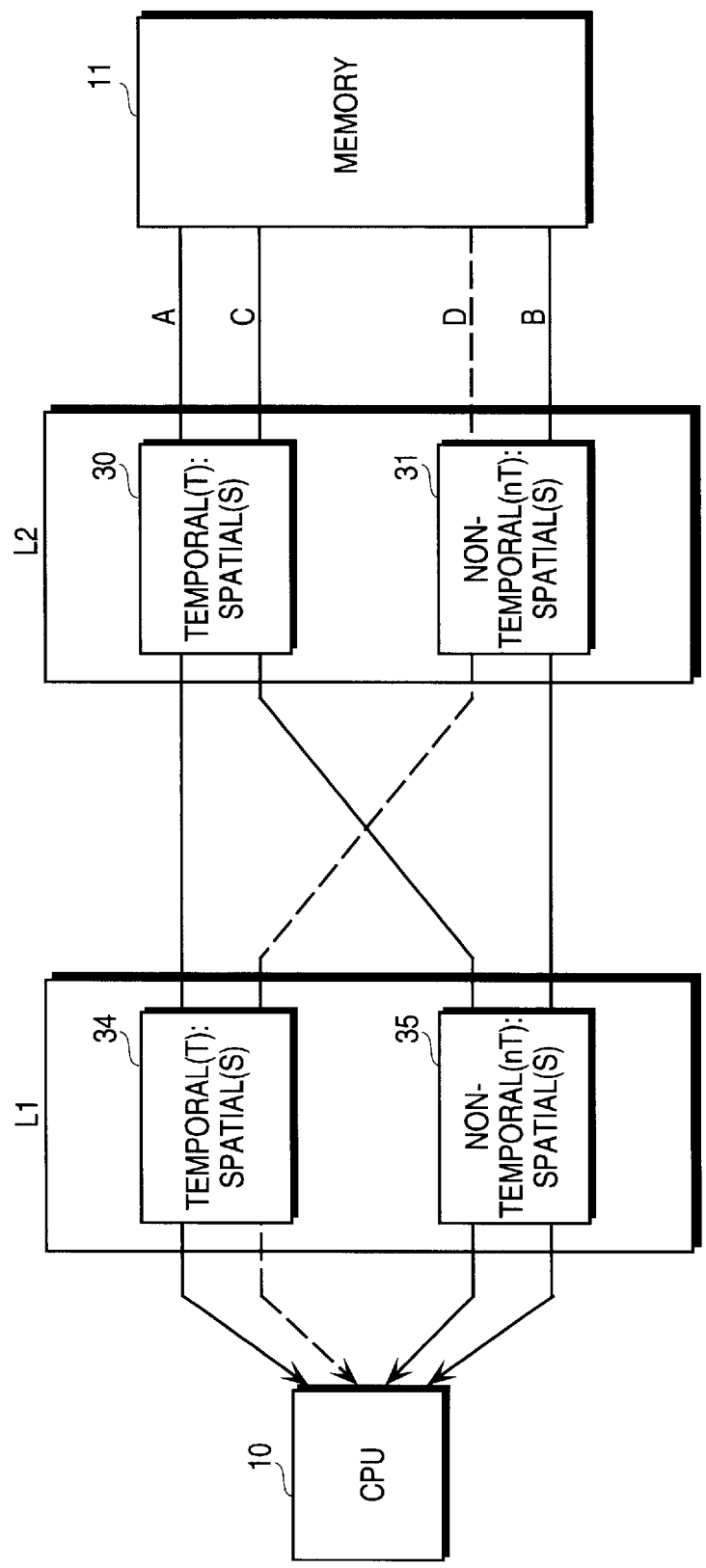
FIG. 4 shows a circuit block diagram of a computer system having two hierarchical levels of cache memories for implementing the preferred embodiment, in which only two of the four data access attributes noted in FIG. 3 are used for each level of the cache hierarchy.

In FIG. 3, four categories (T:S, nT:S, T:nS and nT:nS) are noted and can be readily implemented at each of the cache hierarchy levels. However, it should be appreciated that data accesses can be categorized into more or less classification categories. Accordingly, in the preferred embodiment, a simpler design is implemented and is shown in FIG. 4. The embodiment shown in FIG. 4 is preferred since most data access patterns can still be made to fit within the reduced number of categories shown. In FIG. 4, a cache hierarchy management scheme of the preferred embodiment is shown having only T:S and nT:S categories at each level of the cache hierarchy. Only L1 and L2 levels are shown, but it should be appreciated that additional levels can be readily implemented. The preferred embodiment can be practiced utilizing only one cache level as well. The preferred embodiment shown in FIG. 4 is a sub-set of the invention shown in FIG. 3.

As illustrated in FIG. 4, data accesses can be classified as T:S or nT:S at L2 and the same at L1. With the preferred embodiment, only spatially close data are employed. The nS categories have been disregarded in the cache allocation scheme of the preferred embodiment, since current cache systems are generally based on obtaining a complete cache line. Accordingly, it is the temporal aspect (T or nT) which determines if a particular data access will be cached or not cached. Thus, with only two classifications at each cache hierarchy level, the inter-level pathways are simplified. Since there are only two categories at each level (as shown by blocks 30–31 at L2 and blocks 34–35 at L1), data can reach the CPU 10 from the memory 11 by four potential paths, designated A, B, C and D. Data fitting the T:S condition at a given cache hierarchy level is designated to have cache allocated at that level. Data fitting the nT:S condition at a given level are designated to not have any cache allocation at that level. In the preferred embodiment, nT:S data are placed in a high-speed buffer(s) for the data transfer.

Although there are four potential paths in FIG. 4, only three are actually implemented due to a design rule imposed on the cache hierarchy management scheme of the preferred embodiment. This rule specifies locality attributes based on the following two requirements:

1. If an access is specified T:S with respect to a level Li, then that access is to exhibit T:S locality for Lj for all j>i; and
2. If an access is specified nT:S with respect to a level Li, then that access exhibits nT:S locality for Lj for all j≦i, and it is T:S for all j>i. The above requirements presume that for a given Li, the smaller the value of i, the closer that Li is to the processor in the cache hierarchy.

Thus, because of the above rule, path D is not permitted and, therefore, is shown by a dotted line. The above rule is implemented effectively with the current practice of having the same or larger size caches at each higher level of the cache hierarchy.

Accordingly, in FIG. 4, if data is specified as T:S at L1 then it is to be T:S at L2 and higher. An example of this requirement is shown as path A. If data is specified as nT:S at L1, then it is to be T:S at L2 and higher. An example of this requirement is shown as path C. If data is specified as nT:S at L2, then it is to be nT:S at L1 and T:S at L3 and higher (if there was a L3). An example of this requirement is shown as path B for the two levels L1 and L2. By adhering to the above rule of management in implementing the cache hierarchy management scheme of the preferred embodiment, it is only necessary to identify if the particular access is a T:S or nT:S at one particular level of the cache hierarchy.

Although there are a variety of ways to specify the particular condition for a cache level, in the preferred embodiment computer instructions are used to designate how the data access is to be classified. The T:S or nT:S classification at each cache hierarchy level is specified by a locality "hint" associated with each level for instructions that access the memory 11. For example, when load, store and/or prefetch instructions are executed, the locality hint(s) is/are transferred as part of an instruction to designate the status of the data associated with the access.

Figure 5:
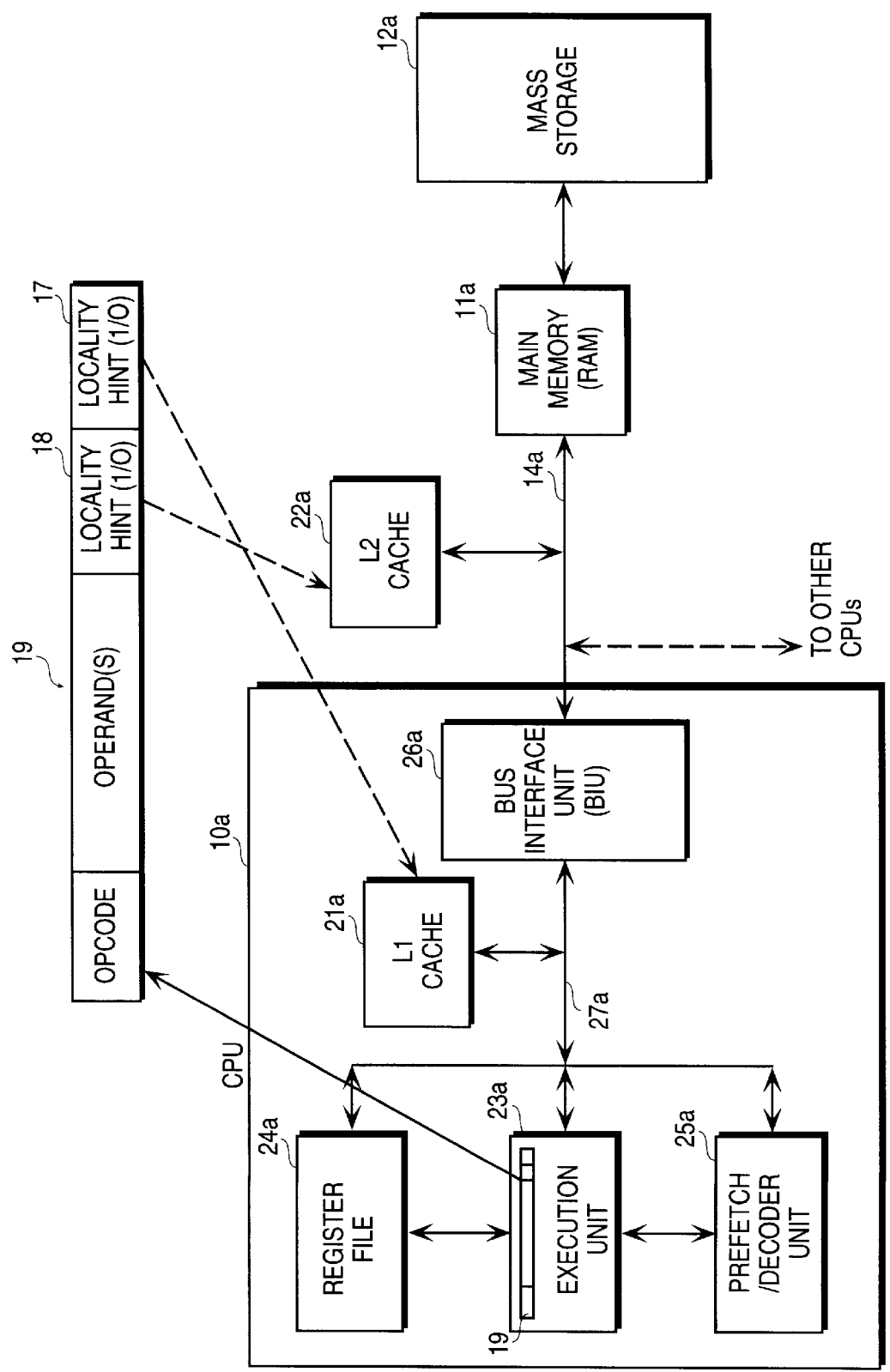
FIG. 5 shows a circuit block diagram of a computer system implementing the present invention, in which hierarchical cache memory architecture is used and in which cache allocation control is provided by locality hint values present in an instruction that accesses data.

An implementation of the preferred embodiment is shown in FIG. 5. The computer system of FIG. 5 is equivalent to the computer system of FIG. 2 (accordingly, letter "a" has been appended to like reference numerals of FIG. 2), but now has a processor 10a, which includes an execution unit 23a for operating on instructions which include the locality hint(s). An instruction 19 is/are shown having a locality hint(s) as part of the instruction. A particular bit or bits in an instruction is associated with the caching of data at each of the cache levels where cache memory allocation is to be designated. In the example shown two bits 17 and 18 are shown. The first bit 17 is used to provide the locality hint value for the L1 cache 21a and the second bit 18 is used to provide the locality hint value for the L2 cache 22a.

The bit-state identifies the attribute assigned for the particular access being attempted by the instruction 19. For example, a "1" bit state for bits 17 and/or 18 designates a T:S condition for a cache level, while a "0" bit state would designate a nT:S condition. Where additional cache levels are present, a bit would be required for each of the cache levels, provided there are only two attributes to be utilized. Where four categories are to be used (such as when the hierarchy structure of FIG. 3 is being implemented), two bits are required for each level. It should be appreciated that not all caches need to utilize the cache hierarchy control provided by the locality hint bit(s). For example, only L1 or only L1 and L2 (in a three-level cache system) may opt to utilize the invention. The other cache(s) would then treat accesses based on the hierarchy rule or on a default condition (such as treating the accesses as a T:S access at that level). Thus, it should be appreciated that numerous variations are available.

The instructions which typically will incorporate the locality hint bit(s) are load, store and prefetch instructions, with primary use attributable to the prefetch instruction. However, it is appreciated that other memory accessing instructions can readily incorporate the present invention. The prefetch instruction prefetches the data (including other instructions) for execution by the processor and it is this prefetching operation that discriminates how the caches should be allocated. It should be noted that in some instances the prefetched data may never be used. This may be due to unused branch conditions or due to a generation of an exception.

With the present invention, cache allocation can be based on the particular type of instruction being executed. For example, load instructions could be either T:S or nT:S with respect to L1 of the cache hierarchy and store instructions could be either T:S with respect to L1, or nT:S with respect to all levels of cache hierarchy. Thus, variations can be introduced based on the particular instruction being executed. Additionally, the scheme of the present invention can be implemented with a T:S default condition, so that the cache hierarchy management could be "shut-off" when not desired (leaving only the default T:S condition for all accesses). This default condition permits instructions written with cache hierarchy management capability to operate with a computer system which does not implement the invention. This aspect of the invention is noted in the flow diagram of FIG. 6.

Figure 6:
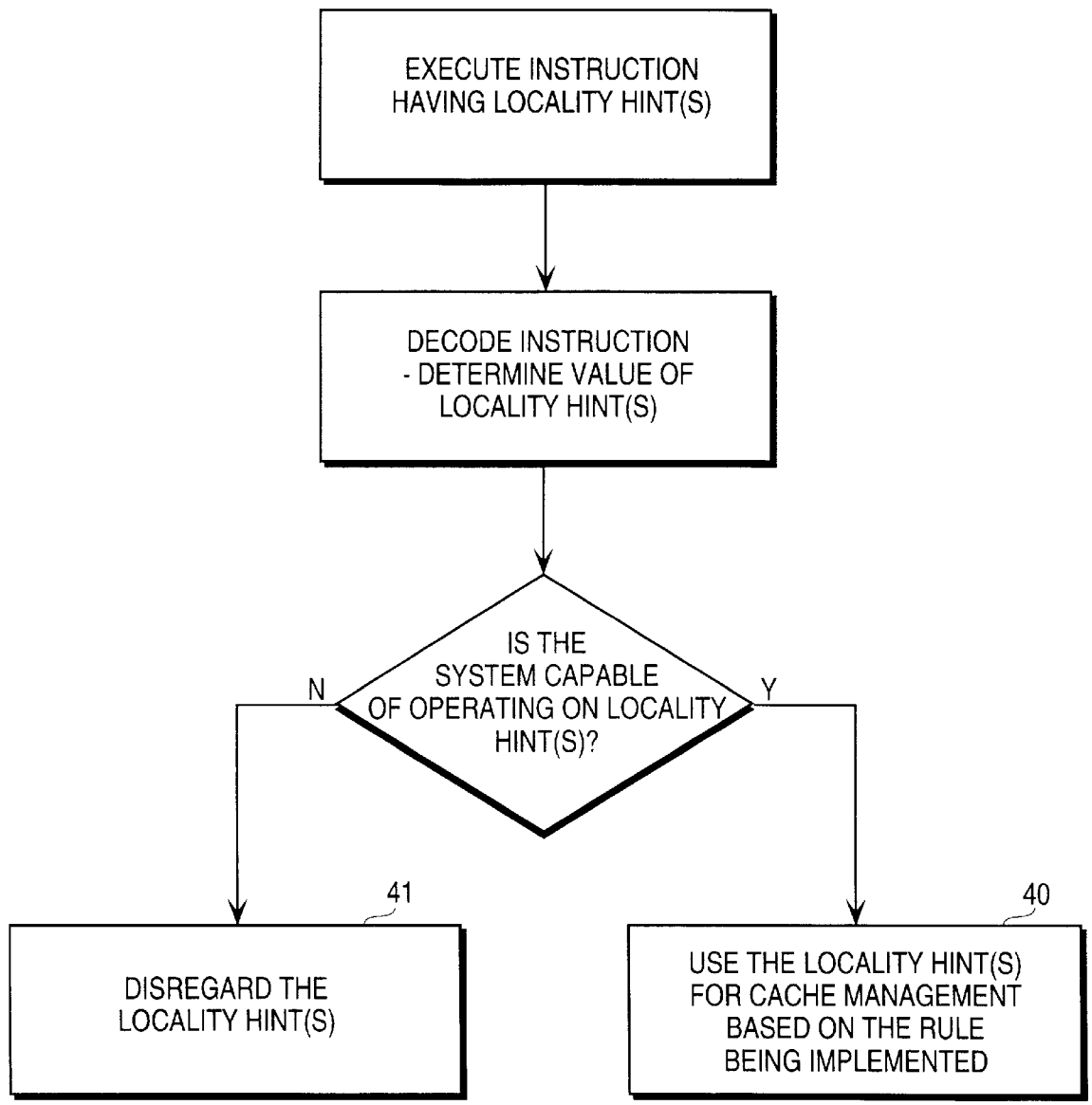
FIG. 6 is a flow diagram showing a method of operation for the computer system illustrated in FIG. 5.

The diagram of FIG. 6 shows what happens when an instruction containing the locality hint(s) of the present invention is executed. If the computer system is capable of processing the locality hint(s), then the cache allocation is based on the hierarchy management scheme of the system when performing the operations dictated by the instruction (as shown in block 40). However, if the computer system is not capable of processing the locality hint(s), the locality hint(s) is/are disregarded (as shown in block 41).

Figure 7:
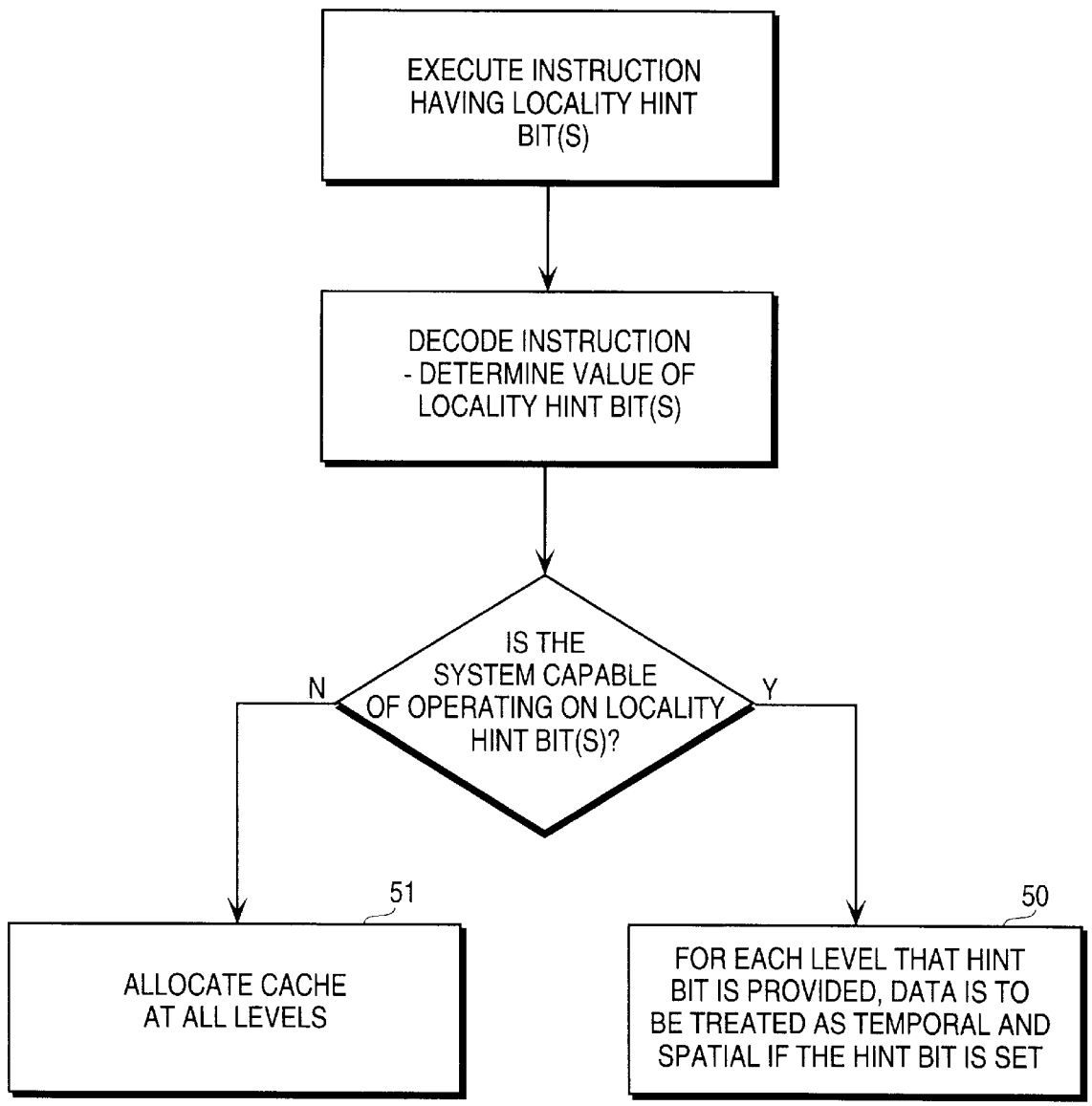
FIG. 7 is a flow diagram showing a preferred method of operation for the computer system illustrated in FIG. 5.

The diagram of FIG. 7 shows what happens in the instance where the preferred embodiment of FIG. 4 is implemented. If the computer system is capable of processing the locality hint bit(s), then the cache allocation is based on the level at which data is regarded as T:S or nT:S (as shown in block 50). The application of the design rule associated with FIG. 4 would utilize this implementation. However, if the computer system is not capable of processing the locality hint(s), the default condition of allocating caches at all levels is used (as shown in block 51).

Again, it should be appreciated that the manner of configuring the classification of data for each cache level is a design choice and various configurations are available without departing from the spirit and scope of the present invention. Examples of the type of data accesses configured using the paths shown in FIG. 4. An example of data utilizing path A are scalar accesses and block of unit-stride vectors that have re-use and are small enough in size to fit in the L1 cache. The size of the memory device utilized for the L1 cache will determine how much data can be cached in the L1 cache. It is presumed that the L2 cache is at least as large (typically larger) in storage size than the L1 cache.

A second path B denotes a situation when data is nT at both levels. In this instance, data reaches CPU 10 without being cached at all. As noted, in the preferred embodiment streaming buffers are used for the data transfer without being cached. Data utilizing path B are read-once unit-stride vectors and block copying of data from one set of address locations to another. Thus, data that are not to be re-used are sent along path B.

A third path C denotes a situation when data is T:S at L2, but the same data is nT:S at L1. In this case, data is cached in the L2 cache, but not in the L1 cache. Such a condition exists when data is re-used, but not so near in the future as to warrant allocating the L1 cache; yet it is allocated at L2 since the size of the L2 cache allows for justifying an allocation at this cache level. The previous described matrix multiplication example fits in this category.

It is to be noted that although only two hierarchical levels have been illustrated, the present invention is applicable with any number of cache levels. In some instances there may be multiple caches at a particular level. For example, there may be two separate caches at L1, one for handling data and the second for handling instructions. Also, as noted earlier, multiple processors (or other memory accessing devices) may be coupled at a particular level. For example, four processors could be coupled at a point between the L1 and L2 caches, so that each processor would have its own L1 cache, but the L2 (and higher level) cache is shared by all four processors (as illustrated in FIG. 5).

Finally, it is to be noted that in the implementation of the preferred embodiment, all data is assumed to have spatial locality. This simplifies the design rule for implementation. However, it should be appreciated that the other two discussed categories of T:nS and nT:nS can be made part of the design equation. In this instance, each cache level will be configured to have four blocks, as shown in FIG. 3. The available combination of paths from memory 11a to CPU 10a will increase significantly, thereby complicating the implementation. However, if so desired, such an undertaking can be achieved without departing from the spirit and scope of the present invention. In such a system, two bits would be allocated in the instructions for identifying the particular classification at each cache level.

Advantages of practicing the present invention reside in the design flexibility in allocating cache memory at each level of the cache hierarchy for a particular data pattern accessed. This design flexibility allows for improved performance in deciding when cache should be allocated based on data access latency and effective cache utilization. The locality hints associated with each cache level reside within the instructions, which benefit both operating systems and application programs. The processor opcodes are written to read the bit(s) associated with the instructions(s) providing the locality hint(s) and respond accordingly for allocating or not allocating the cache(s) for data access. The performance advantage is especially noticeable with multimedia and supercomputing systems requiring a substantially higher rate of processing and data transfer.

Thus, a technique for providing cache hierarchy management is described.

I claim:

1. A computer system for providing cache memory management comprising:

a main memory;

a processor coupled to said main memory for accessing locations of said main memory for data transfer between said processor and said main memory;

a plurality of cache memories coupled to said processor and said main memory and arranged so that a cache memory closest to said processor with respect to data transfer is at a lowest level of a cache hierarchy and any other cache memories in said cache hierarchy are arranged at a higher level or levels in said cache hierarchy;

said processor for receiving an instruction in which a locality hint value is included therein for determining at which of the cache levels cache allocation is to be made, said locality hint value specifying a particular access for data as being temporal or non-temporal at a given one of the cache levels, in the event that said particular access is specified as temporal with respect to a cache level Li, then said particular access is further specified to be temporal for all cache levels Lj, where j is greater than i; in the event that said particular access is specified as non-temporal with respect to a cache level Lk, then said particular access is further specified to be non-temporal for all cache levels Ll, where l is less than or equal to k, and temporal for all cache levels Lm, where m is greater than k, wherein values of k nearest to zero denote said cache level Lk being closer to said processor in said cache hierarchy with respect to data transfer.

2. The computer system of claim 1 wherein said locality hint value is provided by a bit-state of a designated bit(s) within said instruction.

3. The computer system of claim 2 wherein said locality hint value is provided by said bit(s) for each level of said cache hierarchy.

4. The computer system of claim 2 wherein said locality hint value identifies a lowest level where caching is desired and cache is allocated at said lowest level and any higher level or levels.

5. The computer system of claim 2 wherein said locality hint value identifies a lowest level where caching is not desired and cache is not allocated at said lowest level and any lower level(s).

6. The computer system of claim 2 wherein cache is allocated at any level(s) higher than said lowest level where caching is not desired.

7. The computer system of claim 2 further including an additional processor, wherein the processors share one or more of said cache memories.

8. A method of providing an instruction in a computer system having a processor, a first memory and a plurality of cache memories arranged into a cache hierarchy for accessing locations in said first memory by said processor and for transferring data between said processor and said first memory, comprising the steps of:

providing said instruction to be executed by said processor;

providing a locality hint value in said instruction for identifying at which level or levels of said cache hierarchy, cache allocation is to be made when said instruction is executed, said locality hint value specifying a particular access for data as being temporal or non-temporal at a given one of the cache levels, in the event that said particular access is specified as temporal with respect to a cache level $L_i$, then said particular access is further specified to be temporal for all cache levels $L_j$, where j is greater than i; in the event that said particular access is specified as non-temporal with respect to a cache level $L_k$, then said particular access is further specified to be non-temporal for all cache levels $L_l$, where l is less than or equal to k, and temporal for all cache levels $L_m$, where m is greater than k, wherein values of k nearest to zero denote said cache level $L_k$ being closer to said processor in said cache hierarchy with respect to data transfer.

9. The method of claim 8 wherein said locality hint value is provided by a bit-state of a designated bit or bits within said instruction.

* * * * *

UNITED STATES PATENT AND TRADEMARK OFFICE
CERTIFICATE OF CORRECTION

PATENT NO.   : 5,829,025
DATED        : October 27, 1998
INVENTOR(S)  : Mittal

It is certified that error appears in the above-identified patent and that said Letters Patent is hereby corrected as shown below:

In column 8, at line 28, after "is" insert --/are--.

Signed and Sealed this

Tenth Day of April, 2001

Attest:

NICHOLAS P. GODICI

*Attesting Officer*      *Acting Director of the United States Patent and Trademark Office*